Figure 1:
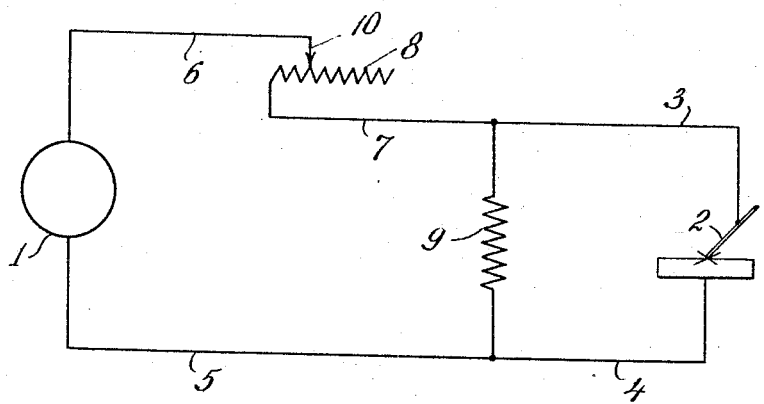

Dec. 30, 1947.   J. M. TYRNER   2,433,678
ELECTRIC ARC WELDING
Filed Sept. 25, 1943

INVENTOR.
Joseph M. Tyrner
BY
ATTORNEYS

Patented Dec. 30, 1947

2,433,678

UNITED STATES PATENT OFFICE 2,433,678

ELECTRIC ARC WELDING

Joseph M. Tyrner, Englewood, N. J., assignor to Air Reduction Company, Incorporated, New York, N. Y., a corporation of New York Application September 25, 1943, Serial No. 503,811

12 Claims. (Cl. 315—299)

This invention relates to electric welding and more particularly to processes and apparatus for terminating the flow of arc welding current so as to avoid the formation of a crater at the end of the welding operation.

When a welding operation is terminated by merely pulling the welding electrode away from the work a crater or porous body remains at the end of the weld. The presence of such craters is particularly objectionable where thin metal is being welded but regardless of the thickness of the metal it is obviously desirable to avoid the formation of craters or spongy sections in the material being welded. The formation of craters may be avoided by gradually reducing the heat of the arc at the end of the welding operation while maintaining the electrode in its normal position and my invention comprises improved apparatus and an improved method of reducing the heat of the arc gradually and ultimately extinguishing the arc without the necessity for drawing the electrode away from the work.

During a normal welding operation the arc voltage is determined primarily by the length of the arc, regardless of the amount of current supplied to the arc. If the supply of current is reduced, the resistance of the arc increases automatically. The voltage of the arc thus remains fairly constant throughout a wide range of current values and the current supplied to the arc is in proportion to the voltage available for the welding circuit. If this voltage is decreased below the normal voltage of the arc the arc is extinguished because the available voltage is not adequate to cause current to flow between the electrode and the work.

The practice heretofore employed with a view to avoiding the formation of a crater has involved either the gradual reduction of the voltage available for the welding circuit to a value equal to or less than that of the arc, or the gradual reduction of the welding current to a very low value. In referring to the voltage available for the welding circuit I have reference to what is commonly referred to as the open circuit voltage characteristic of the welding circuit, for the voltage available at the electrode on open circuit when no current is flowing between the electrode and the work is the same as the voltage impressed on the welding circuit. Those familiar with electric welding realize the fact that a normal welding operation is unstable to the extent that momentary short circuits occur and following these short circuits an electrode voltage higher than the normal welding voltage is required to reignite the arc. To initiate a welding operation it is desirable to have a relatively high voltage available at the electrode so that the initial flow of current will be sufficient to heat the metal rapidly to the desired operating temperature.

In my opinion the most satisfactory method of terminating an electric weld is to gradually reduce the welding current to a very low value under conditions such that the open circuit voltage characteristic and the short circuit current characteristic of the welding circuit are also reduced. It will be understood that the short circuit current characteristic of the welding circuit may be regarded as the current flowing between the electrode and the work when the arc voltage is substantially zero. Some reduction in the open circuit voltage characteristic is desirable in order to prevent sputtering of the arc but in general I prefer not to reduce the open circuit voltage to the point where it is approximately equal to the normal voltage of the arc, in order to insure adequate continuity of the welding current until the welding operation is completed it is desirable to have sufficient voltage available to provide immediate resumption of current flow after each momentary short circuit, until the operation is finally completed. It is desirable to reduce the short circuit current characteristic of the welding circuit as the welding operation is being terminated for in this way the amount of heat generated during each momenary short circuit is reduced thus contributing to the gradual reduction in the arc temperature which insures complete avoidance of crater formation. After the welding current has been reduced to a low value, approximately 10 to 20 per cent of its normal value, it is sometimes desirable to interrupt its flow entirely, and one embodiment of my invention includes this feature which has the advantage of shortening somewhat the time required for terminating the welding operation.

In general I have found that for stable operation during normal welding and for the purpose of avoiding the formation of a crater at the end of a weld it is desirable to have a resistance shunt across the arc. The amount of this resistance may determine the open circuit voltage available at the beginning of a welding operation. Where the welding current is supplied from a constant potential source, several welding electrodes may be connected to the same source of current, and each may employ a different value of resistance determining the initial open circuit voltage. These resistance elements may be adjustable if desired. For the purpose of avoiding the formation of a crater I employ a variable resistance so connected in the welding circuit that an increase in this resistance reduces the welding current and also reduces to the desired extent the open circuit voltage and short circuit current characteristics of the welding circuit, and this is accomplished without changing the voltage of the source or interrupting the flow of current through the resistance in parallel relation with the arc. This variable resistance is preferably connected in series with the welding generator or other source of welding current and an especially valuable characteristic of my invention is that in adjusting this one variable resistance element all of the desired changes in welding current, and in the open circuit voltage and short circuit current characteristics of the welding circuit, can be obtained. After the welding current has been reduced to a low value the arc may be short circuited or otherwise shunted so as to suddenly reduce the arc voltage to such a value that the arc is extinguished. This result may be attained by utilizing the mechanism for increasing the resistance in the welding circuit to thereafter close the desired shunt across the arc.

It will be understood that for each adjustment of the variable resistance to reduce the welding current, the open circuit voltage and short circuit current characteristics of the welding circuit, there is a corresponding voltage available at the electrode on open circuit and a corresponding value of short circuit current flowing between the electrode and the work whenever the arc voltage is substantially zero. These values of open circuit voltage and short circuit current are progressively decreased as the variable resistance is progressively changed to reduce the welding current. Thus the increase in the variable resistance may be said to reduce the open circuit voltage characteristic and also the short circuit current characteristic of the welding circuit.

The various objects and advantages of my invention will be more apparent after considering the following detailed description of certain illustrative embodiments of my invention shown in the accompanying drawings in which—

Figure 2:
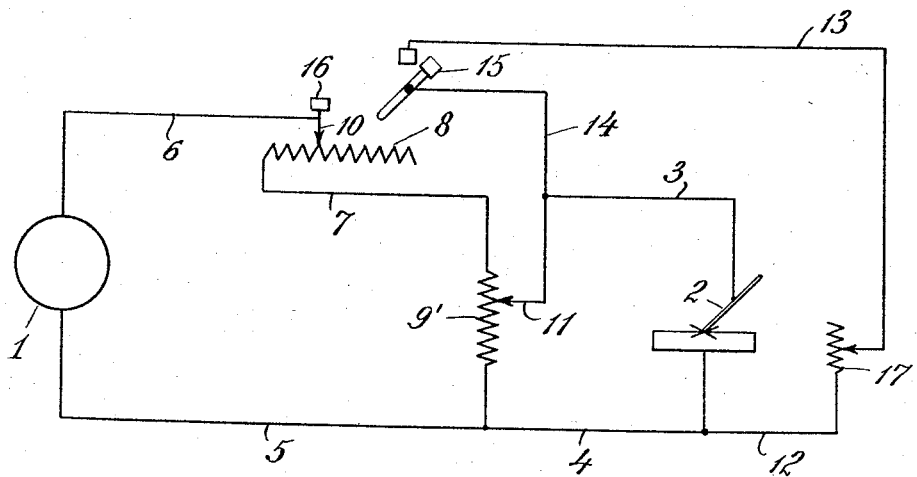

Figure 1 is a diagrammatic illustration of an electric welding system embodying my improved means for avoiding the formation of a crater at the end of the welding operation; and Figure 2 is a diagrammatic illustration of a system similar to that shown in Figure 1 with added features for providing greater flexibility in determining the initial open circuit voltage, and for suddenly terminating the flow of welding current after this current has been gradually reduced to a considerable extent.

In Figure 1, I have illustrated in diagrammatic form a welding generator I for supplying current to a welding circuit including the electrode 2 and the connections 3 and 4, the current being supplied to this circuit through connections 5, 6 and 7 and a variable resistance 8. The welding circuit 2, 3 and 4 is connected across a resistance element 9, the arrangement being such that the variable resistance 8 is connected in series with the generator I and also connected to the parallel circuit including the resistance element 9 and the welding circuit including the electrode 2 and the connections 3 and 4.

The welding system illustrated in Figure 1 is such that the terminal voltage of the generator may remain constant at all times while the desired control of the welding current is obtained by adjusting the variable resistance 8 in the supply circuit. An advantage of this arrangement is that a number of welding circuits may be connected to the same constant potential generator and the current in each welding circuit may be controlled independently.

During normal operation of the welding apparatus illustrated in Figure 1, part of the current supplied by the generator I flows through the resistance element 9 and the remaining portion of the generator current is supplied to the arc in the welding circuit. The normal voltage across the arc, between the electrode 2 and the work, is determined primarily by the length of the arc and the operator holds the electrode handle in such a position that the desired arc length is maintained. This arc voltage during normal operation is substantially lower than the initial open circuit voltage required for igniting the arc at the beginning of the welding operation. During normal operation the amount of current flowing through the resistance element 9 is comparatively small for the voltage drop across this element is the same as that of the arc, neglecting the voltage drop in the connections 3 and 4.

In order to avoid the formation of a crater at the end of a welding operation it is merely necessary to gradually move the adjustable contact 10 along the variable resistance 8 to gradually increase the resistance in the supply circuit. As this resistance is increased, the flow of welding current to the electrode in the welding circuit is gradually reduced. The voltage of the arc remains substantially constant, assuming that the electrode is held in the normal position so that the arc length is kept substantially constant. As the welding current decreases the resistance of the arc increases automatically. This explains why the arc voltage remains substantially constant even though the arc current is reduced. The effect on the current is cumulative in a sense because the current is reduced not only by virtue of the increase in the resistance of the arc but also because of the increase in the resistance in the supply circuit due to the change in the variable resistance 8. The capacity of the variable resistance 8 is such that if the movement of the contact 10 is continued long enough, the flow of current to the electrode is reduced to a value near zero at which time the arc temperature has decreased to such an extent that the current ceases to flow. Under such circumstances the arc may be said to be self-extinguishing.

During the crater elimination operation involving the movement of the adjustable contact 10 to increase the resistance in the generator supply circuit the short circuit current characteristic of the welding circuit is decreased. When a momentary short circuit occurs, due to the passage of a drop of molten metal from the electrode to the work, or for any other reason, the resulting short circuit current is determined by the amount of the variable resistance 8 connected in series with the generator. In other words, this short circuit current equals the generator voltage divided by the amount of the variable resistance 8 connected in the generator circuit.

When no current flows across the arc, the open circuit voltage available for the welding circuit is that fraction of the generator terminal voltage represented by the ratio of shunt connected resistance 9 to the sum of this resistance plus the amount of the variable resistance 8 connected in circuit with the generator.

The equations for the short circuit current characteristic $I_{sh}$ and the open circuit voltage characteristic $e_0$ are as follows:

$$I_{sh} = \frac{E}{R}$$

$$e_0 = \frac{Er}{R+r}$$

where E is the generator terminal voltage, $r$ is the value of the resistance 9 and R is the portion of the variable resistance 8 connected in series with the generator. It is apparent from these equations that as the value of R is increased the open circuit voltage $e_0$ is decreased and the value of the short circuit current $I_{sh}$ is likewise decreased.

The equation for the welding current flowing across the arc, having a resistance $R_a$ is as follows:

$$I = \frac{Er}{R_a(R+r)+rR}$$

As explained above, an increase in the resistance R is accompanied by an increase in the resistance $R_a$ of the arc, and the above equation for the welding current shows how the welding current decreases when these resistances R and $R_a$ increase. The desired decrease in welding current, and in the short circuit current characteristic and open circuit voltage characteristic, are all simultaneously obtained by the adjustment of the single resistance element 8 to increase the amount of resistance in the generator circuit.

In Figure 2, I have illustrated a system similar to that shown in Figure 1 and, therefore, corresponding parts are designated by the same reference characters in these two figures. Figure 2, however, shows certain additional features which are desirable where greater flexibility is needed in determining the initial open circuit voltage or where it is desired to shorten the time required for terminating the welding operation.

In Figure 1, the shunt connected resistance 9 is a constant resistance whereas in Figure 2 the resistance 9' is illustrated as being a variable resistance to the extent that an adjustable contact 11 is provided so that the amount of this resistance connected in parallel with the welding circuit can be adjusted. If this adjustable contact 11 is set at some mid-point along the resistance 9' then the open circuit voltage is less than it would be if this contact were at the upper end of this resistance element in which event the conditions would be the same as those illustrated in Figure 1. Likewise the amount of resistance above the adjustable contact 11 together with the amount of the resistance 8 in the circuit of the generator determine the value of the short circuit current.

After the welding current has been reduced to a low value in the neighborhood of 10 to 20% of its normal value it is quite feasible to suddenly terminate the flow of welding current entirely without danger of forming a crater. In the system as illustrated in Figure 2 this is accomplished by a shunt circuit 12, 13, 14 and a switch 15 arranged to be closed by a member 16 carried by the adjustable contact 10 associated with the variable resistance 8. The arrangement is such that when the movable contact 10 is moved to the right to increase the amount of resistance in the generator circuit, the actuating member 16 closes the switch 15 to complete the shunt circuit across the arc, after the welding current has been reduced to a considerable extent. An adjustable resistance 17 of low capacity may be included in this circuit if desired, but ordinarily I prefer to have no appreciable amount of resistance in this shunt circuit so that when the switch 15 is closed, the arc voltage is suddenly reduced to zero and the arc is thereby extinguished—the voltage available at the arc is no longer sufficient to maintain the flow of current from the electrode to the work. If the variable resistance 17 is employed in the shunt circuit, its value should be low enough so that when the shunt is completed the resulting decrease in the arc voltage is sufficient to cause the flow of current across the arc to cease. In the arrangement, as illustrated in Figure 1, the arc is self-extinguishing by virtue of the fact that there is ultimately a failure of current, whereas in the arrangement illustrated in Figure 2, if the shunt circuit switch 15 is actuated, the arc is finally extinguished by a sudden reduction in the voltage available across the welding circuit.

It will be understood that according to the crater elimination processes above-described in connection with the welding systems illustrated in the figures of the drawing, the formation of a crater can be avoided by the movement of a single resistance contact so arranged that the resulting increase in resistance gradually reduces the welding current and also reduces the open circuit voltage and the short circuit current characteristics of the welding circuit. My invention is not limited to the specific embodiments herein illustrated and described in detail, but includes such modifications thereof as fall within the scope of the appended claims.

I claim:

1. Electric welding apparatus comprising a source of current, a resistance connected across said source, a welding circuit connected across at least a portion of said resistance, an adjustable resistance element connected to the welding circuit and carrying the welding current and the current flowing through the portion of the resistance connected in parallel with the welding circuit, and means for adjusting said resistance element to increase the resistance thereof without changing the amount of resistance in parallel with the welding circuit, to simultaneously reduce the welding current, the open circuit voltage and short circuit current characteristics of the welding circuit.

2. Electric welding apparatus comprising a source of current, a welding circuit connected to said source, a constant resistance connected to said source in parallel relation with said welding circuit, and adjustable resistance element connected in series with said source, and means for increasing the resistance of said element to reduce the amount of current supplied to the welding circuit.

3. Electric welding apparatus comprising a source of current, a welding circuit connected to said source, a constant resistance connected to said source in parallel relation with said welding circuit, an adjustable resistance element connected in series with said source, means for increasing the resistance of said resistance element to reduce the amount of current supplied to the welding circuit, a normally open shunt connection across the welding circuit, and means for closing said shunt circuit after the welding current has been reduced.

4. Electric welding apparatus comprising a source of current, a welding circuit connected to said source, a constant resistance connected to said source in parallel relation with said welding circuit, an adjustable resistance element connected in series with said source, means for increasing the resistance of said resistance element to reduce the amount of current supplied to the welding circuit, and means for automatically establishing a short circuit across the welding circuit after the welding current has been reduced a predetermined amount.

5. Electric welding apparatus comprising a source of current, a welding circuit connected to said source, and means for avoiding the formation of a crater at the end of a weld, comprising a shunt circuit across the welding circuit, said shunt circuit being open during welding, and means for reducing the welding current and for thereafter closing said shunt circuit to interrupt the flow of welding current.

6. Electric welding apparatus comprising a source of current, a welding circuit connected to said source, and means for avoiding the formation of a crater at the end of a weld, comprising a shunt circuit across the welding circuit, said shunt circuit being open during welding, means for reducing the welding current, switching means for closing said shunt circuit, and means responsive to said current reducing means for actuating said switching means after the welding current has been reduced.

7. The method of terminating an electric weld which consists in increasing the resistance of a single adjustable resistance element connected to a parallel circuit including the arc and a constant resistance connected across the arc to reduce the open circuit voltage and short circuit current characteristics of the welding circuit simultaneously with the reduction in welding current.

8. The method of terminating an electric weld which comprises increasing resistance connected in circuit with the welding electrode to reduce simultaneously the welding current, the open circuit voltage and short circuit current characteristics of the welding circuit and continuing such resistance variation until the arc is extinguished.

9. The method of terminating an electric weld which comprises increasing resistance connected in circuit with the welding electrode to reduce simultaneously the welding current, the open circuit voltage and short circuit current characteristics of the welding circuit, and then connecting a shunt circuit across the welding circuit to interrupt the flow of welding current.

10. The method of terminating an electric weld which comprises increasing resistance connected in circuit with the welding electrode to reduce simultaneously the welding current, the open circuit voltage and short circuit current characteristics of the welding circuit while maintaining a constant resistance in parallel with the arc.

11. The method of terminating an electric weld which comprises increasing resistance connected in circuit with the welding electrode to reduce simultaneously the welding current, the open circuit voltage and short circuit current characteristics of the welding circuit while maintaining a constant resistance in parallel with the arc, and then connecting a shunt across the arc to interrupt the flow of welding current.

12. The method of terminating an electric weld which comprises increasing resistance in circuit with the welding electrode to reduce simultaneously the welding current, the open circuit voltage and short circuit current characteristics of the welding circuit, and then reducing the voltage available at the arc to a value below that required to maintain the flow of welding current, while continuing the flow of current through the resistance.

JOSEPH M. TYRNER.

REFERENCES CITED

The following references are of record in the file of this patent:

UNITED STATES PATENTS

| Number | Name | Date |
|---|---|---|
| 1,218,269 | Kenyon | Mar. 6, 1917 |
| 1,542,702 | Kingsland | June 16, 1925 |
| 1,215,921 | Evans | Feb. 13, 1917 |
| 1,218,266 | Kenyon | Mar. 6, 1917 |
| 1,542,702 | Kingsland | June 16, 1925 |
| 1,645,149 | Mann | Oct. 11, 1927 |
| 2,139,160 | Hebeler | Dec. 6, 1938 |
| 2,305,206 | Strobel | Dec. 10, 1942 |
| 2,308,199 | Mullenbach | Jan. 12, 1943 |